United States Patent
Salif et al.

(10) Patent No.: US 12,208,799 B2
(45) Date of Patent: Jan. 28, 2025

(54) METHOD FOR CONTROLLING PROPULSION OF A HEAVY-DUTY VEHICLE

(71) Applicant: VOLVO TRUCK CORPORATION, Gothenburg (SE)

(72) Inventors: Ramadan Salif, Gothenburg (SE); Viktor Lägnert, Gothenburg (SE); Teodoro Bora, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 18/569,547

(22) PCT Filed: Jun. 14, 2021

(86) PCT No.: PCT/EP2021/065973
§ 371 (c)(1),
(2) Date: Dec. 12, 2023

(87) PCT Pub. No.: WO2022/262937
PCT Pub. Date: Dec. 22, 2022

(65) Prior Publication Data
US 2024/0286615 A1   Aug. 29, 2024

(51) Int. Cl.
*B60W 30/18* (2012.01)
*B60K 28/16* (2006.01)
(Continued)

(52) U.S. Cl.
CPC ....... *B60W 30/18172* (2013.01); *B60K 28/16* (2013.01); *B60T 8/175* (2013.01);
(Continued)

(58) Field of Classification Search
CPC ........... B60W 30/18172; B60W 10/16; B60W 10/18; B60W 2300/145; B60W 2510/104;
(Continued)

(56) References Cited

U.S. PATENT DOCUMENTS

| 2004/0041469 A1 | 3/2004 | Ishikawa et al. |
| 2011/0246031 A1 | 10/2011 | Uematsu et al. |

(Continued)

FOREIGN PATENT DOCUMENTS

| EP | 1396402 B1 | 6/2006 |
| EP | 3569436 A1 | 11/2019 |

(Continued)

OTHER PUBLICATIONS

International Search Report and Written Opinion of the International Searching Authority in corresponding International Application No. PCT/EP2021/065973 mailed Feb. 18, 2022 (12 pages).

(Continued)

*Primary Examiner* — Timothy Hannon
(74) *Attorney, Agent, or Firm* — Venable LLP; Jeffri A. Kaminski (57) ABSTRACT

A method for controlling propulsion of a heavy-duty vehicle, where the heavy-duty vehicle comprises a differential drive arrangement arranged in connection to a drive axle with a left wheel and a right wheel is provided. The method includes determining a nominal shaft slip corresponding to a desired wheel force to be generated by the drive axle wheels, wherein the nominal shaft slip is indicative of a difference between a current vehicle velocity and a vehicle velocity corresponding to the shaft speed, determining a difference between a speed of the left wheel and a speed of the right wheel, adjusting the nominal shaft slip in dependence of a magnitude of the wheel speed difference to a target shaft slip, and controlling the shaft speed based on the target shaft slip.

15 Claims, 5 Drawing Sheets

(51) Int. Cl.
*B60T 8/175* (2006.01)
*B60W 10/04* (2006.01)
*B60W 10/16* (2012.01)
*B60W 10/18* (2012.01)
*B60T 8/1764* (2006.01)

(52) U.S. Cl.
CPC ............ *B60W 10/04* (2013.01); *B60W 10/16* (2013.01); *B60W 10/18* (2013.01); *B60T 8/1764* (2013.01); *B60T 2201/16* (2013.01); *B60T 2270/213* (2013.01); *B60W 2300/145* (2013.01); *B60W 2510/104* (2013.01); *B60W 2510/20* (2013.01); *B60W 2520/06* (2013.01); *B60W 2520/10* (2013.01); *B60W 2520/266* (2013.01); *B60W 2520/28* (2013.01); *B60W 2520/30* (2013.01); *B60W 2710/1038* (2013.01); *B60W 2710/18* (2013.01)

(58) Field of Classification Search
CPC ... B60W 2520/266; B60W 2710/1038; B60W 2710/18; B60K 28/16; B60T 8/175; B60T 2270/213
See application file for complete search history.

(56) References Cited

U.S. PATENT DOCUMENTS

| | | |
|---|---|---|
| 2014/0222308 A1 | 8/2014 | Stevens |
| 2018/0134156 A1 | 5/2018 | Nonaka et al. |
| 2021/0078581 A1 | 3/2021 | Velazquez Alcantar et al. |

FOREIGN PATENT DOCUMENTS

| | | |
|---|---|---|
| GB | 2562308 A | 11/2018 |
| JP | 2015112978 A | 6/2015 |
| SE | 542776 C2 | 7/2020 |

OTHER PUBLICATIONS

Written Opinion of the International Preliminary Examining Authority in corresponding International Application No. PCT/EP2021/065973 mailed Jun. 3, 2022 (6 pages).

International Preliminary Report on Patentability in corresponding International Application No. PCT/EP2021/065973 mailed Sep. 7, 2023 (6 pages).

METHOD FOR CONTROLLING PROPULSION OF A HEAVY-DUTY VEHICLE

CROSS-REFERENCE TO RELATED APPLICATIONS

This application is a U.S. National Stage application of PCT/EP2021/065973, filed Jun. 14, 2021 and published on Dec. 22, 2022, as WO 2022/262937, all of which is hereby incorporated by reference in its entirety.

TECHNICAL FIELD

The present disclosure relates to methods and control units for ensuring safe and efficient vehicle motion management of a heavy-duty vehicle. The methods are particularly suitable for use with cargo transporting vehicles, such as trucks and semi-trailers. The invention can, however, also be applied in other types of heavy-duty vehicles, e.g., in construction equipment and in mining vehicles, as well as in cars.

BACKGROUND

Heavy-duty vehicles, such as trucks and semi-trailer vehicles, are designed to carry heavy loads. The heavily laden vehicles must be able to start from standstill also in uphill conditions and accelerate reliably on various types of road surfaces.

Excessive wheel slip occurs when too much torque is applied to an axle, or to a wheel compared to what is supported by the current road friction and normal load. Excessive wheel slip is undesired since it results in an unpredictable vehicle behavior, loss of tractive force, and also in an energy inefficient operation.

GB2562308 A discusses wheel slip and proposes methods for limiting a maximum regenerative braking torque which can be applied to a wheel. The controller uses a tyre model to determine a maximum usable traction for each wheel and calculates the maximum regenerative braking force to be applied to each wheel based on this tyre model.

A differential drive arrangement allows a single power source, such as a combustion engine or an electric machine, to power both wheels on a driven axle. An open differential drive arrangement distributes torque evenly over the drive axle. However, in scenarios where one wheel starts to spin faster than the other wheel, for instance due to varying friction conditions, the power transferred to the wheels will differ. This problem may become especially pronounced in so-called split friction conditions, where severely sub-optimal propulsion can be experienced.

EP1396402B1 discloses a method for controlling motion of a heavy-duty vehicle, where the vehicle comprises an open differential driven axle, and where the vehicle wheel forces are controlled based on a wheel slip target.

US2018134156 discusses a reduction of the target slip value in response to a large wheel speed difference.

US 2021078581 A1 discloses methods for controlling wheel slip of a vehicle.

However, despite the advancements to-date, there is a continuing need for further improvements in vehicle motion management in heavy-duty vehicles, and in particular for vehicles comprising open differential drive arrangements.

SUMMARY

It is an object of the present disclosure to provide techniques which alleviate or overcome at least some of the above-mentioned problems. This object is at least in part obtained by a method for controlling propulsion of a heavy-duty vehicle, where the heavy-duty vehicle comprises a differential drive arrangement arranged in connection to a drive axle with a left wheel and a right wheel. The method comprises determining a nominal shaft slip corresponding to a desired wheel force to be generated by the drive axle wheels, wherein the nominal shaft slip is indicative of a difference between a current vehicle velocity and a vehicle velocity corresponding to the shaft speed. The method also comprises determining a difference between a speed of the left wheel and a speed of the right wheel, and adjusting the nominal shaft slip in dependence of a magnitude of the wheel speed difference to a target shaft slip and also controlling the shaft speed based on the target shaft slip.

The vehicle control systems discussed herein are able to react quickly to a detected wheel speed difference in order to, e.g., maintain traction. The proposed system advantageously complements known traction control systems which apply friction brakes or the like to transfer torque away from a spinning wheel of an open differential. The proposed methods adjust shaft speed already for relatively small wheel speed differences, and is thereby able to improve traction before the actual traction control system kicks in. It is an advantage that the shaft speed control can be actuated with low latency, since the forward motion of a heavy-duty vehicle in, e.g., an uphill driving condition with uneven friction on the sides of the vehicle, can be maintained. The target shaft slip may for instance be obtained by multiplying the nominal shaft slip by a reduction factor $\alpha \leq 1$, where the reduction factor $\alpha$ decreases with the magnitude of the wheel speed difference. The actual function for determining the reduction factor may be configured specifically for a given vehicle, or for a given type of vehicle, thus customizing the control methods for even higher performance. The method may also comprise controlling the shaft speed based on the target shaft slip by adjusting the shaft speed to obtain the target shaft slip. The shaft slip may, e.g., be defined as $$\lambda_0 = \frac{K\omega_0 - v_x}{\max(|K\omega_0|, |v_x|)}$$

where K represents a conversion factor between axle speed $\omega_0$ and vehicle speed $v_x$, such that $K\omega_0 = v_x$ at zero wheel slip for both wheels and at equal wheel speeds.

According to aspects, the reduction factor $\alpha$ is determined as $$\frac{1}{\alpha} = \min\left(\max\left(\frac{\max(\omega 1, \omega 2) - \min(\omega 1, \omega 2)}{\Delta_{max}} - 1, 1.0\right), 2.0\right)$$

and the target shaft slip $\lambda_T$ relates to the nominal shaft slip $\lambda_0$ as $$\lambda_\tau = \alpha \lambda_0$$

According to aspects, the difference between the speed of the left wheel and the speed of the right wheel is adjusted based on a vehicle path curvature and/or on a vehicle steering angle. Thus, wheel speed differences due to steering are compensated for. This improves the performance of the methods when the vehicle is cornering.

According to aspects, the method also comprises configuring the target shaft slip equal to the nominal shaft slip if the magnitude of the difference between the speed of the left wheel and the speed of the right wheel is below a predetermined threshold. This way the shaft slip is not reduced until the wheel slip difference is deemed significant. The frequency of control intervention is thereby reduced, which can be an advantage in some scenarios.

According to aspects, the target shaft slip is adapted according to a bandwidth constraint, where the bandwidth constraint is smaller for a decreasing target shaft slip compared to an increasing target shaft slip. This way the shaft slip is quickly reduced in response to detecting an increase in wheel speed difference, but more slow to increase again if the wheel speed difference becomes smaller. This provides a more robust control of the heavy-duty vehicle.

According to aspects, the target shaft slip is adapted such that neither of the speed of the left wheel and the speed of the right wheel exceeds a wheel slip limit configured in dependence of the nominal shaft slip. This means that neither of the two wheels will experience a too high slip, and risk loose traction, which is an advantage. This also simplifies the overall slip control of the shaft slip.

According to aspects, the method comprises triggering a service brake intervention procedure in case the magnitude of the difference between the speed of the left wheel and the speed of the right wheel exceeds a split-u condition threshold. In other words, the herein proposed methods may be used with advantage together with legacy traction control system, which apply brake torque to the spinning wheel in order to transfer torque over to the wheel with more traction.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
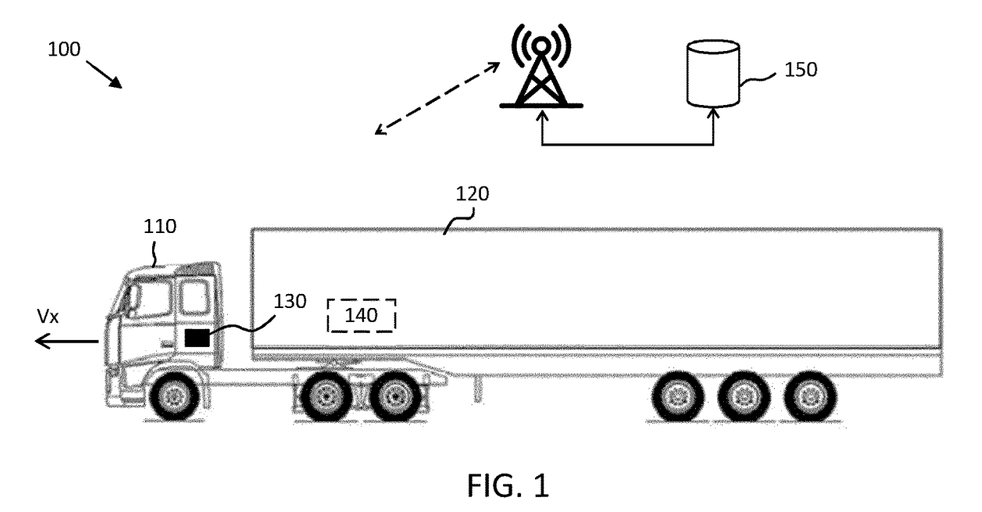
FIG. 1 schematically illustrates a vehicle for cargo transport.

FIG. 1 illustrates a heavy-duty vehicle 100. This particular example comprises a tractor unit 110 which is arranged to tow a trailer unit 120. The tractor 110 comprises a vehicle electronic control unit (ECU) 130 arranged to control various functions of the vehicle 100. For instance, the ECU may be arranged to perform a vehicle motion management (VMM) function comprising control of wheel slip, vehicle unit stability, and so on. The trailer unit 120 optionally also comprises an ECU 140, which then controls one or more functions on the trailer 120. The ECU or ECUs may be communicatively coupled, e.g., via wireless link, to a remote server 150. This remote server may be arranged to perform configuration of the ECU, and to provide various forms of data to the ECU 130, such as providing data regarding the make and type of tyres mounted on the vehicle 100, and information related to a relationship between generated wheel force and wheel slip, i.e., an inverse tyre model, as will be discussed in more detail below in connection to FIG. 3.

The vehicle combination 100 may of course also comprise additional vehicle units, such as one or more dolly units and more than one trailer unit. The techniques disclosed herein are applicable to rigid trucks, and also to passenger cars, although the main benefit of the proposed technique is obtained when used with heavy-duty vehicle for cargo transport.

Propulsion of a heavy-duty vehicle like the vehicle 100 has traditionally been controlled using control loops based on torque requests. However, the torque-based control loops of a heavy duty vehicle are normally associated with time constants on the order of 10 ms or so. In some scenarios this time constant reduces overall vehicle control bandwidth to a point where the startability and overall vehicle motion management of the heavy duty vehicle may be negatively affected, especially when road friction is uneven. To improve control during, e.g., vehicle launch, it is proposed herein to base propulsion control on wheel slip requests (or, equivalently, wheel speed relative the vehicle speed) instead of on torque. This means that the propulsion device on the vehicle 100 is requested by the ECU 130 to maintain wheel slip at a target wheel slip value $\lambda_{target}$ which has been determined in order to obtain a desired motion by the vehicle. For instance, if the target wheel slip is set at 0.1, then the wheel rotational velocity will be continuously set at a relative difference of 0.1 above the vehicle velocity so that the wheel will always be slipping by the configured amount. Notably, this control strategy is different compared to just imposing a wheel slip limit, and performing torque-based on control of the propulsion as long as the wheel slip stays below the configured wheel slip limit.

Figure 2:
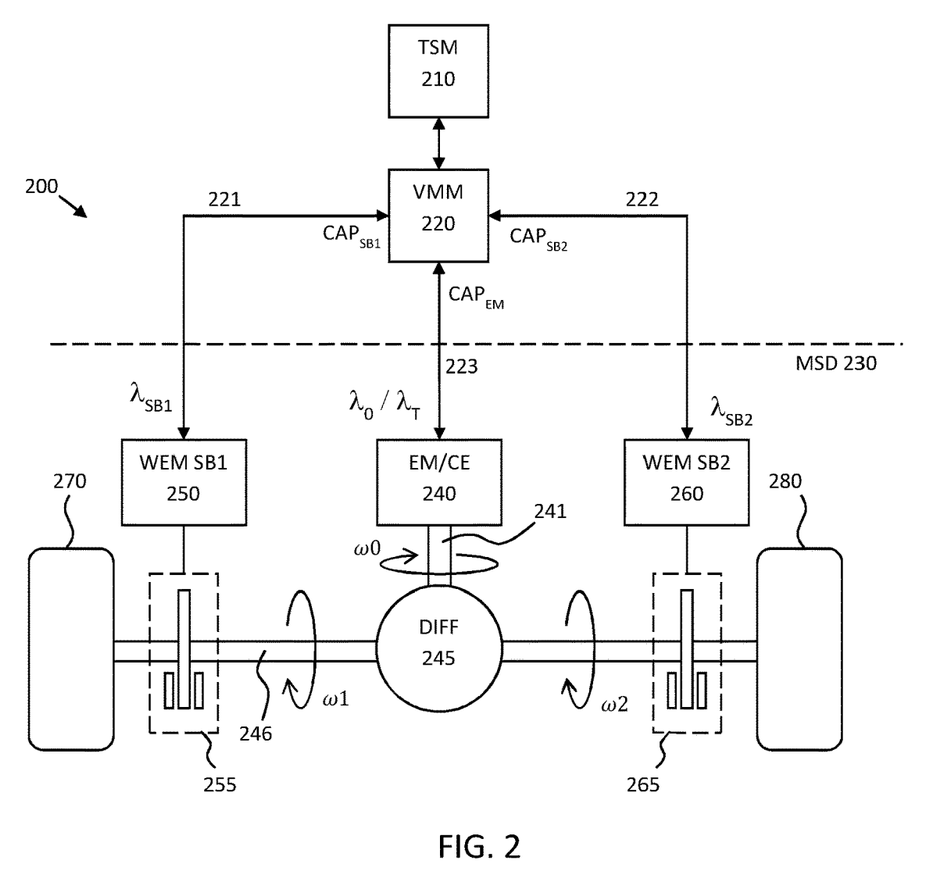
FIG. 2 shows a drive axle with a differential drive arrangement.

FIG. 2 schematically illustrates functionality 300 for controlling a left wheel 270 and a right wheel 280 on a driven axle 246 by some example MSDs, here comprising friction brakes 255 (such as disc brakes or drum brakes) and a propulsion device 240 such as an electric machine (EM) or a combustion engine (CE). The friction brakes 255, 265 and the propulsion device 240 are examples of wheel torque generating devices, which may also be referred to as actuators and which can be controlled by one or more motion support device control units 250, 260. In this example the service brakes SB1, SB2 are assumed to be controlled by respective wheel end module (WEM) controllers 250, 260, while the propulsion device 240 comprises an integrated control unit not shown in FIG. 2.

The propulsion device 240 is connected to the drive axle 246 via a differential drive arrangement 245. This differential drive arrangement may, e.g., be an open differential which distributes torque evenly over the two wheels.

A traffic situation management (TSM) function 210 plans driving operations with a time horizon of, e.g., 1-10 seconds or so. This time frame corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 220 which performs force allocation to meet the requests from the TSM in a safe and robust manner, based at least in part based on capability reports (CAP) received from the various MSD control units.

Desired acceleration profiles and curvature profiles may optionally be determined based on input from a driver via a human machine interface of the heavy-duty vehicle via normal control input devices such as a steering wheel, accelerator pedal and brake pedal, although the techniques disclosed herein are just as applicable with autonomous or semi-autonomous vehicles. The exact methods used for determining the acceleration profiles and curvature profiles is not within scope of the present disclosure and will therefore not be discussed in more detail herein.

The control commands, i.e., the requests sent to the MSD controllers 240, 250, 260 from the VMM function 210 comprises wheel slips λ to be maintained by the respective MSDs.

Both the friction brakes and the propulsion device interact with the road surface via wheels 270, 280 comprising respective tyres. Thus, the tyre properties and behavioral characteristics has an impact on how the different control actions by the friction brakes and the propulsion device generate vehicle motion. A software-based tyre model is optionally comprised in the system. This tyre model provides information about the tyre currently mounted on the wheel, its properties, and behavioral characteristics. The tyre model may, as mentioned above, be implemented as a look-up table or other type of function. The tyre model is parameterized, i.e., defined, by one or more tyre parameters. This means that the function itself varies in dependence of the tyre properties. The tyre model can be used to model various relationships, as exemplified above, such as a relationship or mapping between wheel slip and generated wheel force, and/or a mapping between tyre wear rate and vehicle state such as tyre normal load, vehicle speed, and wheel slip. It is appreciated that the present disclosure is not limited to any particular form of tyre model structure. Rather, it is appreciated that many different types of mathematical and/or experimentally based functions and mappings can be used as the tyre model.

A tyre model can be used to define a relationship between longitudinal tyre force Fx for a given wheel and an equivalent longitudinal wheel slip for the wheel. Longitudinal wheel slip $\lambda_x$ relates to a difference between wheel rotational velocity and speed over ground and will be discussed in more detail below. Wheel, axle or shaft rotation speed ω is a rotational speed given in units of, e.g., rotations per minute (rpm) or angular velocity in terms radians/second (rad/sec) or degrees/second (deg/sec). The wheel behavior in terms of wheel force generated in longitudinal direction (in the rolling direction) and/or lateral direction (orthogonal to the longitudinal direction) as function of wheel slip is discussed in "Tyre and vehicle dynamics", Elsevier Ltd. 2012, ISBN 978-0-08-097016-5, by Hans Pacejka. See, e.g., chapter 7 where the relationship between wheel slip and longitudinal force is discussed.

Longitudinal wheel slip $\lambda_x$ may, in accordance with SAE J670 (SAE Vehicle Dynamics Standards Committee Jan. 24, 2008) be defined as $$\lambda_x = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda_x$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

It is also possible to define a nominal shaft slip $$\lambda_0 = \frac{K\omega_0 - v_x}{\max(|K\omega_0|, |v_x|)}$$

where K represents a conversion factor between axle speed $\omega_0$ and vehicle speed $v_x$, including any in-between gear ratios and the like, such that $K\omega_0=v_x$ at zero wheel slip for both wheels and at equal wheel speeds.

Lateral wheel slip $\lambda_y$ can be defined as $$\lambda_y = \frac{v_y}{\max(|R\omega|, |v_x|)}$$

where $v_y$ is the lateral speed of the wheel (in the coordinate system of the wheel), measured on a direction orthogonal to the direction of the longitudinal speed $v_x$ The present disclosure relates primarily to longitudinal wheel slip, although it is appreciated that the two are connected, mainly since the ability to generate lateral wheel force depends strongly on the longitudinal wheel slip.

A tyre is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force $F_x$ by the wheel since, normally, $F_x \leq \mu F_z$, where $\mu$ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

Figure 3:
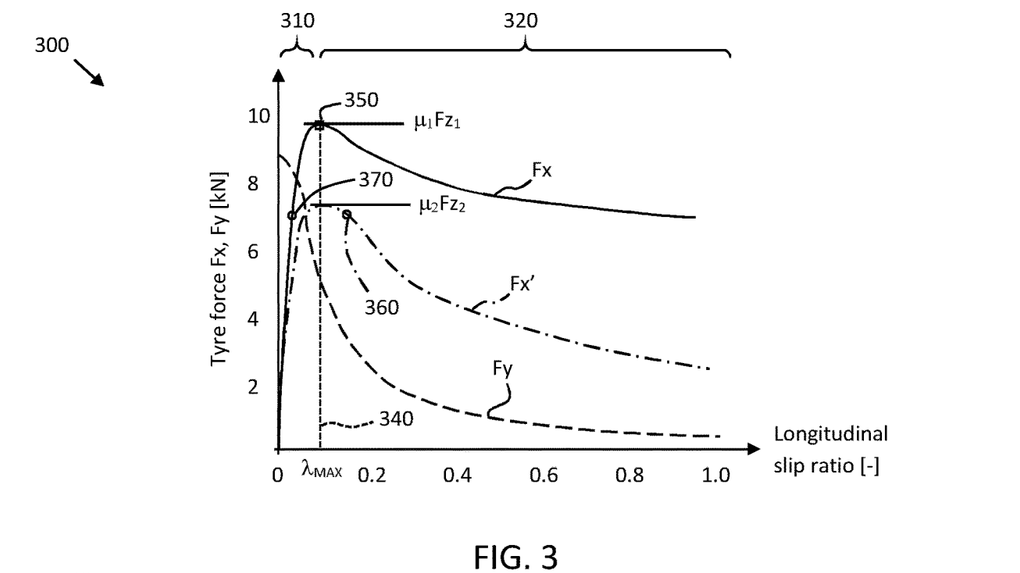
FIG. 3 is a graph showing an example of a tyre model.

In order for a wheel (or tyre) to produce a wheel force, slip must occur. For smaller slip values the relationship between slip and generated force are approximately linear, where the proportionality constant is often denoted as the slip stiffness of the tyre. FIG. 3 shows a graph 300 illustrating an example of achievable tyre forces $F_x$, $F_y$ as function of wheel slip. The longitudinal tyre force $F_x$ shows an almost linearly increasing part 310 for small wheel slips, followed by a part 320 with more non-linear behavior for larger wheel slips. The obtainable lateral tyre force $F_y$ decreases rapidly even at relatively small longitudinal wheel slips. It is desirable to maintain vehicle operation in the linear region 310, where the obtainable longitudinal force in response to an applied brake command is easier to predict, and where enough lateral tyre force can be generated if needed. To ensure operation in this region, a wheel slip limit $\lambda_{LIM}$ on the order of, e.g., 0.1, can be imposed on a given wheel, which ensures operation in the linear region 310.

A tyre model of this kind can be determined by practical experimentation, analytical derivation, computer simulation, or a combination of the above. In practice, the tyre model may be represented by a look-up table (LUT) indexed by the tyre parameters, or as a set of coefficients describing a polynomial or the like. There the set of coefficients are selected based on the tyre parameters, and where the polynomial then describes the relationship between tyre behavior and vehicle state.

With reference again to FIG. 2, a difficulty when using wheel slip-based control together with open differential drive arrangements is that the wheels may end up spinning at different speeds, due to varying friction and/or normal load on the wheels. Also, different tyre conditions on the left- and right-hand side wheels may affect the wheel speeds. This means that, if a nominal shaft speed ω0 is configured based on some nominal inverse tyre model Fx, which corresponds to a desired wheel slip on the inverse tyre model, then the desired wheel force may not be obtained due to variation in friction, normal load, or tyre condition at the two wheels of the drive axle. FIG. 3 illustrates an example of this type of situation, where the shaft speed has been configured to maximize wheel force for a nominal inverse tyre model Fx, i.e., at the wheel slip indicated as 350. However, one wheel is spinning much faster than the other due to varying friction conditions ($\mu_1$ compared to $\mu_2$) and/or varying normal load ($Fz_1$ compared to $Fz_2$), and therefore has a different inverse tyre model curve Fx', which has resulted in that one wheel is operating at the point 360 while the other is operating at the point 370, i.e., about 6 kN in wheel force less compared to the optimal traction case where both wheels provide a wheel force close to 10 kN, giving a propulsion force on the order of 20 kN. Also, the capability of generating lateral force by the wheel associated with the operating point 360 is severely limited, which may jeopardize safe vehicle motion management.

Figure 4A:
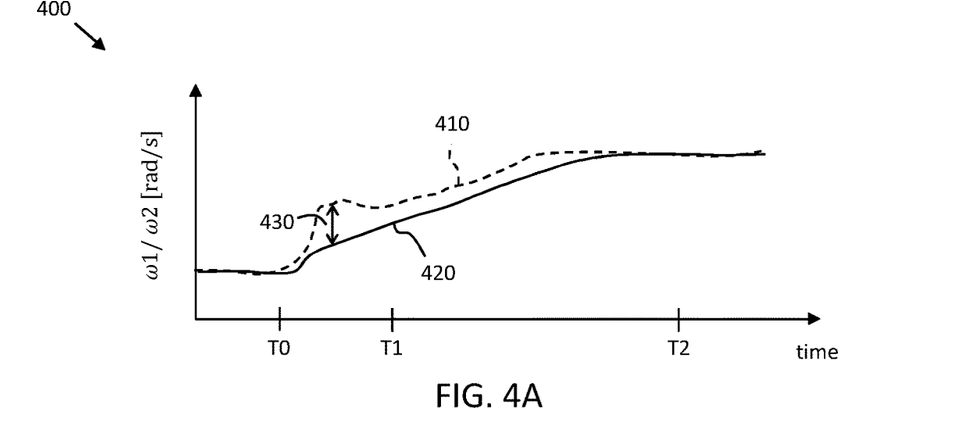
FIGS. 4A-B illustrate vehicle control in a varying friction condition.
Figure 4B:
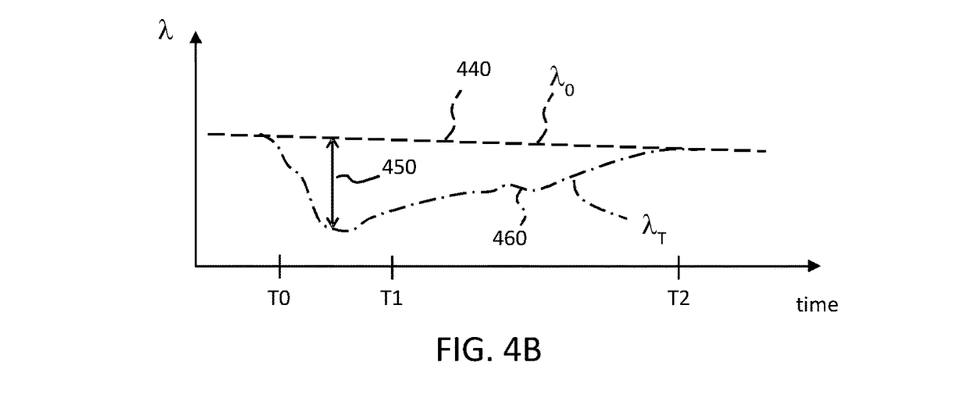

To improve the vehicle propulsion control when friction, tyre properties, and/or normal load on the wheels differs on the left- and right-hand side of a driven axle, it is proposed herein to rapidly reduce the shaft slip when a difference in wheel speed is detected over the driven axle. This will move the slipping wheel back closer to the linear region 310, where the traction is much better, and is also likely to reduce the relative difference in wheel speeds. The concept is illustrated in FIGS. 4A and 4B, which shows a graph 400 of wheel speed (FIG. 4A) and drive shaft slip (FIG. 4B). At time T0, the vehicle encounters a split friction driving condition. This causes one of the wheel speeds 410, dashed line, to diverge from the other wheel speed 420, solid line, whereby a wheel speed difference 430 arises. This difference then starts to become smaller at time T1, and eventually goes away entirely at time T2 when the two wheel speeds have again converged.

During this time period T1 to T3 when there is a difference in wheel speeds, the respective operating points on the inverse tyre model curve will diverge, as discussed in connection to FIG. 3 above, away from the desired operating point. Most likely, the total generated wheel force by the two wheels will be sub-optimal due to the wheel speed difference, and the sub-optimally configured shaft slip. For instance, one wheel may be slipping severely while another wheel may be more or less free-rolling, i.e., not slipping at all and therefore not generating any traction force at all. To rapidly bring the slipping wheel under control again, it is proposed to temporarily reduce the nominal shaft slip $\lambda_0$ 440 by an amount 450 determined as a function of the magnitude of the wheel speed difference 430 to a target shaft slip $\lambda_T$, 460.

Figure 5:
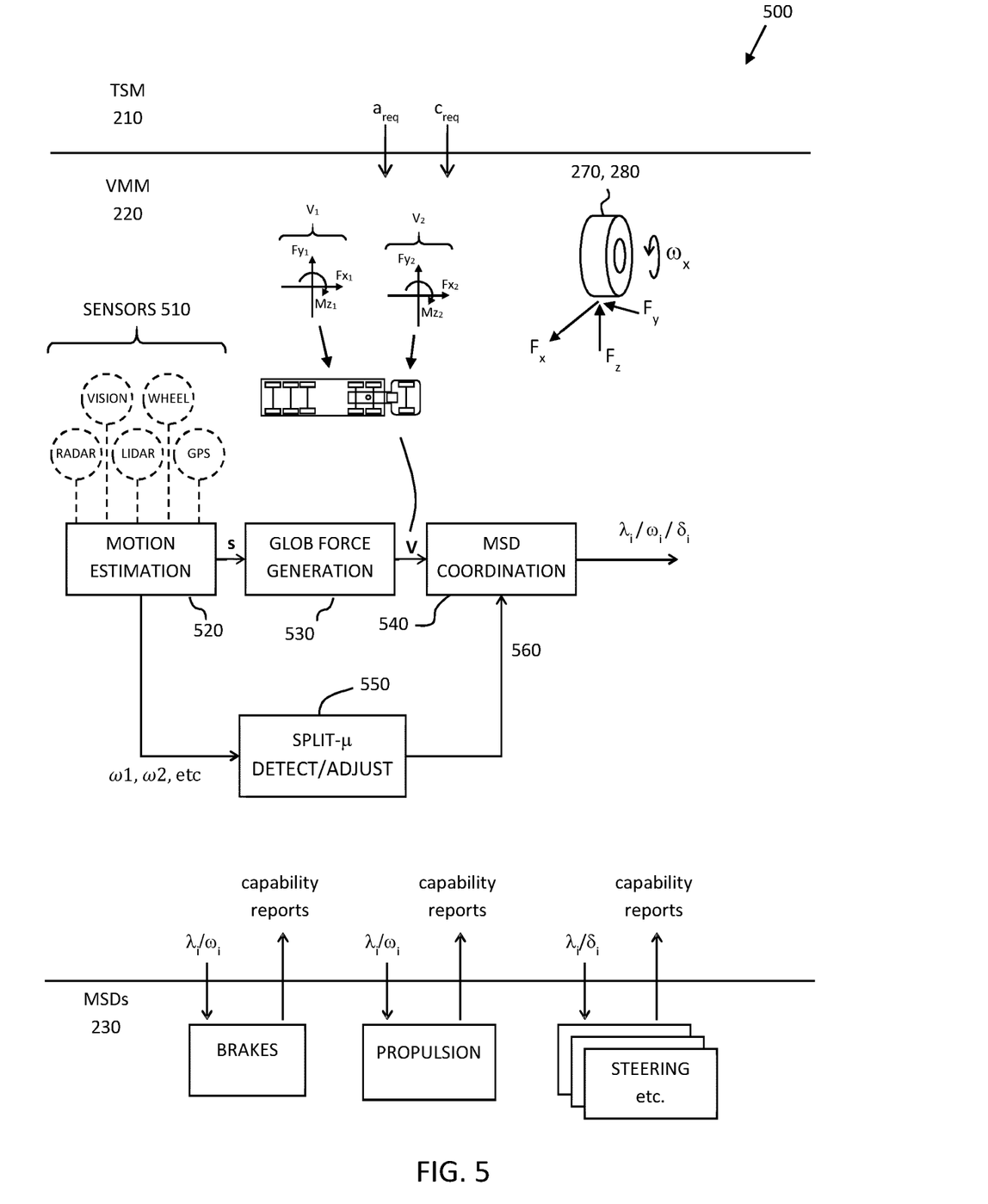
FIG. 5 shows a control architecture for controlling a heavy-duty vehicle.

FIG. 5 shows an example of a vehicle control stack 500 comprising the above-mentioned TSM and VMM functions, where the proposed technique may be implemented with advantage. Sensors 510 arranged to provide data about the vehicle environment provides input to the overall control stack 500, and a connection to remote processing resources, such as cloud-based processing resources like the remote server 150 in FIG. 1 are also optionally comprised in the control stack.

As mentioned above, the VMM function 210 operates with a time horizon of about 0.1-1.5 seconds or so, and continuously transforms the acceleration profiles $a_{req}$ and curvature profiles $c_{req}$ into control commands for controlling vehicle motion functions, actuated by the different MSDs of the vehicle 100 which report back capabilities to the VMM, which in turn are used as constraints in the vehicle control. The accuracy of this control is improved by means of the advanced tyre models 380 discussed herein.

The VMM function 210 performs vehicle state or motion estimation 520, i.e., the VMM function 210 continuously determines a vehicle state s (often a vector variable) comprising positions, speeds, accelerations, yaw motions, normal forces and articulation angles of the different units in the vehicle combination by monitoring vehicle state and behavior using various sensors 510 arranged on the vehicle 100, often but not always in connection to the MSDs.

The result of the motion estimation 520, i.e., the estimated vehicle state s, is input to a global force generation module 530 which determines the required global forces on the vehicle units which need to be generated in order to meet the motion requests from the TSM 210. An MSD coordination function 540 allocates, e.g., wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100. As indicated in FIG. 5, the MSD coordination function 540 may output any of wheel slips $\lambda_i$, wheel rotation speeds $\omega$, and/or steering angles $\delta_f$ to the different MSDs.

A split-µ control module 550 is arranged to monitor wheel speed differences, and to intervene in case the wheel speeds diverge. When this happens, a control signal is sent to the MSD coordination module 540 which will reduce the configured shaft slip in response to the control signal 560. Thus, the wheel speed is rapidly brought back under control.

Figure 6:
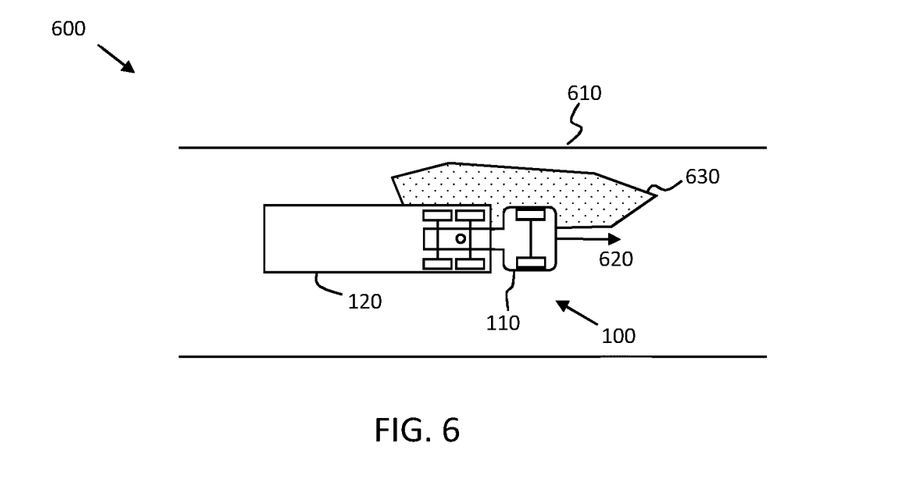
FIGS. 6-7 illustrate different split friction operating scenarios.

FIG. 6 illustrates an example split-µ scenario 600, where a heavy-duty vehicle 100 drives straight on a road 610 in a forward direction with vehicle velocity $v_x$ 620. A region of low friction 630 is encountered by the left wheels of the vehicle 100. When this happens, the left-hand side wheels may start to spin faster than the right-hand side wheels, giving rise to the sub-optimal operating points illustrated in FIG. 3, i.e., where one wheel is to the right of the nominal desired slip and the other wheel is to the left of the desired operating point. The herein proposed techniques will then quickly step in and reduce the shaft slip down to a level where the speed of the spinning wheel is reduced, thus improving overall traction very fast, much faster than would have been possible using legacy traction control system based on slow torque-based control of service brakes. The methods proposed herein also act in a more continuous manner, and may be configured to activate already at small wheel speed differences. Traction control system often require larger wheel speed differences before they kick in, due to robustness reasons.

Figure 7:
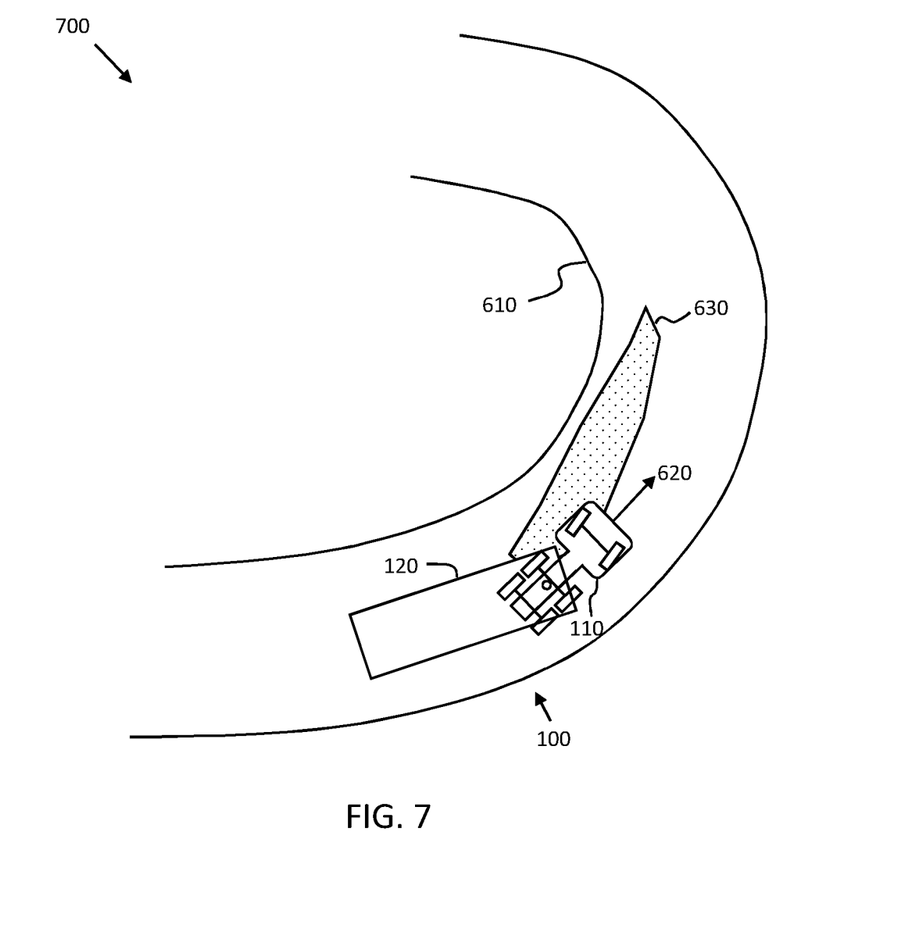

FIG. 7 illustrates another example scenario 700, but now the vehicle is cornering, i.e., follows a path associated with a curvature. The curvature itself gives rise to a difference in wheel speeds. This wheel speed difference is preferably accounted for by the method, i.e., such wheel speed differences due to planned curve taking will optionally not result in a modified shaft slip. However, the vehicle 100 encounters a region 630 of low friction, which causes the wheel speed difference to deviate from that expected from the curvature, which may cause a reduction in shaft slip request to the propulsion device.

Figure 8:
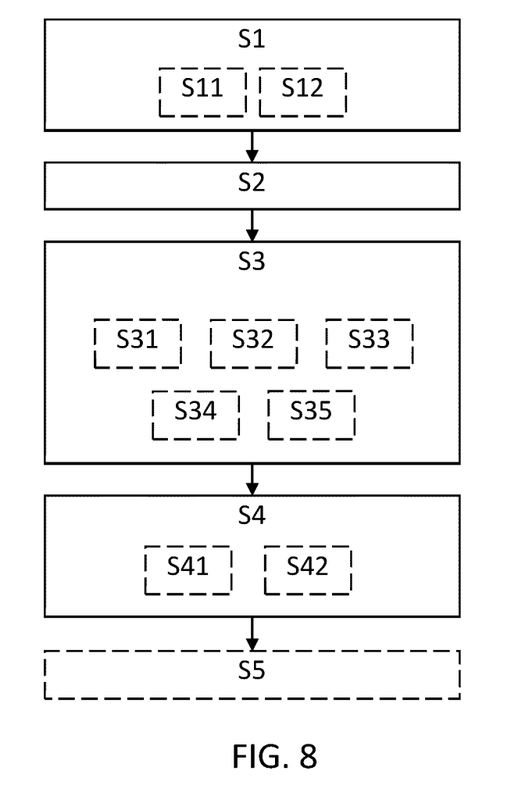
FIG. 8 is a flow chart illustrating example methods.

FIG. 8 is a flow chart which summarizes the herein disclosed techniques. There is illustrated a method for controlling propulsion of a heavy-duty vehicle 100, where the heavy-duty vehicle 100 comprises a differential drive arrangement 245 arranged in connection to a drive axle 246 with a left wheel 270 and a right wheel 280, as discussed above in connection to FIG. 2. The method comprises determining S1 a nominal shaft slip $\lambda_0$, 440 corresponding to a desired wheel force $F_x$ to be generated by the drive axle wheels 270, 280, wherein the nominal shaft slip is indicative of a difference between a current vehicle velocity $v_x$ and a vehicle velocity corresponding to the shaft speed $\omega 0$.

Shaft slip is a measure of the difference between how fast the shaft is rotating compared to how fast the vehicle is moving, of course accounting for the total gear ratio, wheel radius, and so on. Shaft slip is akin to a measure of wheel slip, albeit measured in the drive shaft instead of on the wheel axle. Shaft slip may, e.g., be defined S11 as $$\lambda_0 = \frac{K\omega_0 - v_x}{\max(|K\omega_0|, |v_x|)}$$

where K represents a conversion factor between axle speed $\omega_0$ and vehicle speed $v_x$, such that $K\omega_0=v_x$ at zero wheel slip for both wheels and equal wheel speeds. The nominal shaft slip may, e.g., be determined by the MSD coordination module 540 discussed in connection to FIG. 5 in order to obtain a desired total wheel force from the wheels on the driven axle. A tyre model such as that discussed in connection to FIG. 3 may be used to translate between desired tyre force and shaft slip.

The method also comprises determining S2 a difference between a speed $\omega 1$ of the left wheel and a speed $\omega 2$ of the right wheel. This wheel speed difference, or at least the magnitude thereof, is preferably determined by using left and right-hand side wheel speed sensors. The difference in wheel speeds may then be determined with high bandwidth, i.e., with an update latency on the order of 1 ms or less, by the MSD control units 230 and/or by the VMM unit 220. The vehicle ECU 130 also has access to accurate information about the speed of the vehicle in the forward direction, which means that accurate determination of shaft slip is enabled.

It is appreciated that some vehicle maneuvers, like cornering, will involve a difference in wheel speed which is not due to wheel slippage. Thus, optionally, the difference between the speed $\omega 1$ of the left wheel and the speed $\omega 2$ of the right wheel is adjusted S32 based on a vehicle path curvature $c_{req}$ and/or on a vehicle steering angle $\delta$. The actual adjustment may be obtained from a model of the vehicle, comprising vehicle dimensions and the like, or simply tabulated based on practical experimentation. An example scenario comprising cornering when encountering split friction conditions were discussed above in connection to FIG. 7.

Due to the above-mentioned problems relating to wheel speed differences in slip-controlled differential drive arrangement, the method comprises adjusting S3 the nominal shaft slip $\lambda_0$, 440 in dependence of a magnitude of the wheel speed difference to a target shaft slip $\lambda_T$, 460, and controlling S4 the shaft speed $\omega 0$ based on the target shaft slip $\lambda_T$, 460, e.g., by adjusting S41, S42 the shaft speed $\omega 0$ to obtain, or to be below, the target shaft slip $\lambda_T$, 460. Thus, as soon as one wheel starts to slip due to encountering lower friction (after the optional compensation for expected wheel speed difference due to steering), the proposed method immediately reduces the nominal shaft slip down to a lower target shaft slip. This means that the rightmost operating point on the inverse tyre model curve is shifted to the left, with a resulting improved vehicle propulsion. The control can be made very fast, i.e., with very small latency.

According to aspects, the target shaft slip $\lambda_T$, 460 is obtained S31 by multiplying the nominal shaft slip $\lambda_0$, 440 by a reduction factor $\alpha \leq 1$, where the reduction factor $\alpha$ decreases with the magnitude of the wheel speed difference. This reduction factor is generally a function of the wheel speed difference magnitude. For instance, the reduction factor $\alpha$ may be determined as $$\frac{1}{\alpha} = \min\left(\max\left(\frac{\max(\omega 1, \omega 2) - \min(\omega 1, \omega 2)}{\Delta_{max}} - 1, 1.0\right), 2.0\right)$$

with $\lambda_T = \alpha \lambda_0$

The method may also comprise configuring S33 the target shaft slip $\lambda_T$, 460 to be equal to the nominal shaft slip $\lambda_0$, 440 if the magnitude of the difference between the speed $\omega 1$ of the left wheel and the speed $\omega 2$ of the right wheel is below a pre-determined threshold. Thus, in other words, the herein disclosed methods can be triggered only if the wheel speed difference exceeds some value considered substantial, and be left inactivated as long as the wheel speeds only differ by some small value below the threshold.

It may be desirable to quickly reduce the target shaft slip $\lambda_T$, 460 when wheel speeds start to diverge, and to more slowly bring the target shaft slip $\lambda_T$, 460 back towards the nominal shaft slip $\lambda_0$, 440 once the wheel speeds start to converge again. For instance, the target shaft slip may be iteratively updated using a step-length, as $$\lambda_T^{(k+1)} = w(\alpha\lambda_0 - \lambda_T^{(k)}) + \lambda_T^{(k)}$$

where k is an iteration index. The magnitude of w determines the bandwidth constraint. A large w allows for rapid convergence, and vice versa. The magnitude of w may be selected as a function of the rate of change in the wheel speed difference, i.e., if $$|\omega_1^{(k)} - \omega_2^{(k)}| < |\omega_1^{(k+1)} - \omega_2^{(k+1)}|$$

then wheel speed difference is increasing and w is then selected larger compared to the case where $$|\omega_1^{(k)} - \omega_2^{(k)}| > |\omega_1^{(k+1)} - \omega_2^{(k+1)}|$$

To summarize, according to some aspects, the target shaft slip $\lambda_T$, 460 is adapted S34 according to a bandwidth constraint, where the bandwidth constraint is smaller for a decreasing target shaft slip $\lambda_T$, 460 compared to an increasing target shaft slip $\lambda_T$, 460.

The target shaft slip $\lambda_T$, 460 is optionally also adapted S35 such that neither of the speed ω1 of the left wheel and the speed ω2 of the right wheel exceeds a wheel slip limit configured in dependence of the nominal shaft slip $\lambda_0$, 440. This can be realized in a number of different ways. For instance, with reference to FIG. 3, in case one of the wheel slips 360, 370 exceeds a pre-determined slip limit of, say 0.1, then the shaft speed w, is reduced until both wheels show wheel slips below the configured wheel slip threshold. This implies that the nominal shaft slip $\lambda_0$, 440 is reduced down to a target shaft slip $\lambda_T<\lambda_0$ at which both wheels operate below the slip limit.

The methods disclosed herein optionally also comprise triggering S5 a service brake intervention procedure in case the magnitude of the difference between the speed ω1 of the left wheel and the speed ω2 of the right wheel exceeds a split-u condition threshold. Thus, the herein proposed methods may be used as a complement to existing traction control systems which apply service brakes 255, 265 to transfer propulsion power away from a fast slipping wheel to the not-so fast slipping wheel. Such traction control methods are known and will therefore not be discussed in more detail herein. Related to this, EP1396402B1 discloses a method for controlling motion of a heavy-duty vehicle, where the vehicle comprises an open differential driven axle, and where the vehicle wheel forces are controlled based on a wheel slip target, i.e., a wheel slip limit. EP1396402B1 discloses monitoring of a difference in wheel speeds over the driven axle, and reduces wheel slip if the difference in wheel speeds increases, such that neither of the wheel slips exceed the initial target slip value. However, EP1396402B1 does not relate to control of shaft slip.

According to some aspects of the disclosed methods, a relationship between nominal shaft slip $\lambda_0$, 440 and desired wheel force $F_x$ is given by an inverse tyre model 300, as discussed above in connection to FIG. 3. The method then comprises initially obtaining S12 this inverse tyre model. The model may be pre-configured as a software update of the ECU 130, or obtained from the remote server 150.

Figure 9:
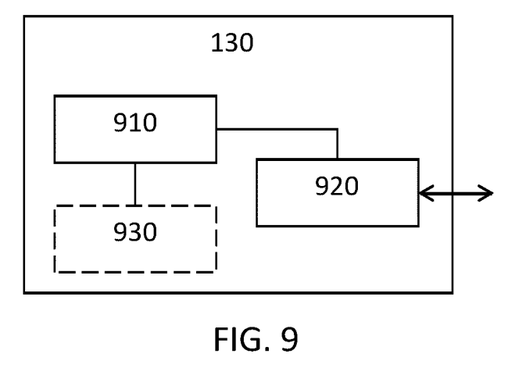
FIG. 9 schematically illustrates a sensor unit and/or a control unit.

FIG. 9 schematically illustrates, in terms of a number of functional units, the components of a control unit according to embodiments of the discussions herein, such as any of the ECUs 130, 140 (exemplified by 130 in FIG. 9). This control unit may be comprised in the articulated vehicle 100. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit to perform a set of operations, or steps, such as the methods discussed in connection to FIG. 8. For example, the storage medium 930 may store the set of operations, and the processing circuitry 910 may be configured to retrieve the set of operations from the storage medium 930 to cause the control unit to perform the set of operations. The set of operations may be provided as a set of executable instructions. Thus, the processing circuitry 910 is thereby arranged to execute methods as herein disclosed.

Thus, there is also disclosed herein a control unit 130 arranged to control propulsion of a heavy-duty vehicle 100, where the heavy-duty vehicle 100 comprises a differential drive arrangement 245 arranged in connection to a drive axle 246 with a left wheel 270 and a right wheel 280, the control unit comprising processing circuitry 910 configured to determine a nominal shaft slip $\lambda_0$, 440 corresponding to a desired wheel force $F_x$ to be generated by the drive axle wheels 270, 280, wherein the nominal shaft slip is indicative of a difference between a current vehicle velocity $v_x$ and a vehicle velocity corresponding to the shaft speed ω0, determine a difference between a speed ω1 of the left wheel and a speed ω2 of the right wheel, adjust the nominal shaft slip $\lambda_0$, 440 in dependence of a magnitude of the wheel speed difference to a target shaft slip $\lambda_T$, 460, and control the shaft speed ω0 based on the target shaft slip $\lambda_T$, 460.

The storage medium 930 may also comprise persistent storage, which, for example, can be any single one or combination of magnetic memory, optical memory, solid state memory or even remotely mounted memory.

The control unit may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit, e.g., by sending data and control signals to the interface 920 and the storage medium 930, by receiving data and reports from the interface 920, and by retrieving data and instructions from the storage medium

930. Other components, as well as the related functionality, of the control node are omitted in order not to obscure the concepts presented herein.

Figure 10:
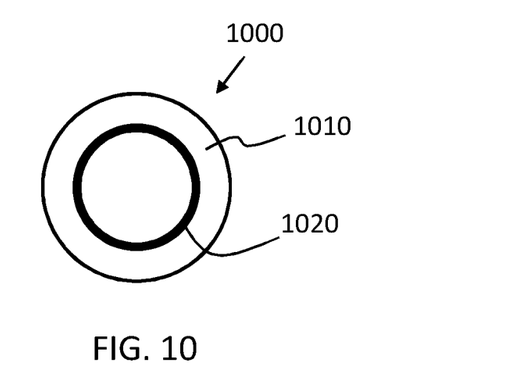
FIG. 10 shows an example computer program product.

FIG. 10 illustrates a computer readable medium 1010 carrying a computer program comprising program code means 1020 for performing the method illustrated in FIG. 8, when said program product is run on a computer. The computer readable medium and the code means may together form a computer program product 1000.

The invention claimed is:

1. A method for controlling propulsion of a heavy-duty vehicle, where the heavy-duty vehicle comprises a differential drive arrangement arranged in connection to a drive axle with a left wheel and a right wheel, the method comprising
- determining a nominal shaft slip corresponding to a desired wheel force (Fx) to be generated by the drive axle wheels, wherein the nominal shaft slip is indicative of a difference between a current vehicle velocity ($v_x$) and a vehicle velocity corresponding to the shaft speed ($\omega 0$),
- determining a difference between a speed ($\omega 1$) of the left wheel and a speed ($\omega 2$) of the right wheel,
- adjusting the nominal shaft slip in dependence of a magnitude of the wheel speed difference to a target shaft slip,
- wherein the target shaft slip is smaller than the nominal wheel slip by an amount determined as a function of the magnitude of the wheel speed difference, and
- controlling the shaft speed ($\omega 0$) based on the target shaft slip.

2. The method according to claim 1, wherein the target shaft slip is obtained by multiplying the nominal shaft slip by a reduction factor $\alpha \leq 1$, where the reduction factor $\alpha$ decreases with the magnitude of the wheel speed difference.

3. The method according to claim 2, where $$\frac{1}{\alpha} = \min\left(\max\left(\frac{\max(\omega 1, \omega 2) - \min(\omega 1, \omega 2)}{\Delta_{max}} - 1, 1.0\right), 2.0\right)$$

and where the target shaft slip $\lambda_T$ relates to the nominal shaft slip $\lambda_0$ as $$\lambda_T = \alpha \lambda_0,$$

$\Delta_{max}$ represents a largest possible value of the difference $\max(\omega 1, \omega 2) - \min(\omega 1, \omega 2)$, $\max(a1, a2)$ represents a maximum value between a1 and a2, and $\min(b1, b2)$ represents a minimum value between b1 and b2.

4. The method according to claim 1, where the difference between the speed of the left wheel and the speed of the right wheel is adjusted based on a vehicle path curvature and/or on a vehicle steering angle.

5. The method according to claim 1, comprising configuring the target shaft slip equal to the nominal shaft slip if the magnitude of the difference between the speed of the left wheel and the speed of the right wheel is below a predetermined threshold.

6. The method according to claim 1, where the target shaft slip is adapted according to a bandwidth constraint, where the bandwidth constraint is smaller for a decreasing target shaft slip compared to an increasing target shaft slip.

7. The method according to claim 1, where the target shaft slip is adapted such that neither of the speed of the left wheel and the speed of the right wheel exceeds a wheel slip limit configured in dependence of the nominal shaft slip.

8. The method according to claim 1, comprising triggering a service brake intervention procedure in case the magnitude of the difference between the speed of the left wheel and the speed of the right wheel exceeds a split-m condition threshold.

9. The method according to claim 1, where shaft slip is defined as $$\lambda_0 = \frac{K\omega_0 - v_x}{\max(|K\omega_0|, |v_x|)}$$

where K represents a conversion factor between axle speed $\omega_0$ and vehicle velocity $v_x$, such that $K\omega_0 = v_x$ at zero wheel slip for both wheels and at equal wheel speeds, and $\max(a1, a2)$ represents a maximum value between a1 and a2.

10. The method according to claim 1, where a relationship between the nominal shaft slip and the desired wheel force is given by an inverse tire model, the method comprising initially obtaining this inverse tire model.

11. The method according to claim 1, comprising controlling the shaft speed based on the target shaft slip by adjusting the shaft speed to obtain the target shaft slip.

12. The method according to claim 1, comprising controlling the shaft speed based on the target shaft slip by adjusting the shaft speed to be below the target shaft slip.

13. A non-transitory computer readable medium carrying a computer program that causes the steps of claim 1 to be performed when said computer program is run on a computer or on processing circuitry of a control unit.

14. A control unit arranged to control propulsion of a heavy-duty vehicle, where the heavy-duty vehicle comprises a differential drive arrangement arranged in connection to a drive axle with a left wheel and a right wheel, the control unit comprising processing circuitry configured to
- determine a nominal shaft slip corresponding to a desired wheel force to be generated by the drive axle wheels, wherein the nominal shaft slip is indicative of a difference between a current vehicle velocity and a vehicle velocity corresponding to the shaft speed,
- determine a difference between a speed of the left wheel and a speed of the right wheel,
- adjust the nominal shaft slip in dependence of a magnitude of the wheel speed difference to a target shaft slip,
- wherein the target shaft slip is smaller than the nominal wheel slip by an amount determined as a function of the magnitude of the wheel speed difference, and
- control the shaft speed based on the target shaft slip.

15. A vehicle comprising the control unit according to claim 14.

* * * * *